US010658091B1

(12) United States Patent
Kandel et al.

(10) Patent No.: US 10,658,091 B1
(45) Date of Patent: May 19, 2020

(54) CERAMIC ELECTRICAL INSULATION COATING

(71) Applicant: The Florida State University Research Foundation, Inc., Tallahassee, FL (US)

(72) Inventors: Hom Kandel, Tallahassee, FL (US); Jun Lu, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 1011 days.

(21) Appl. No.: 14/330,326

(22) Filed: Jul. 14, 2014

Related U.S. Application Data

(60) Provisional application No. 61/845,737, filed on Jul. 12, 2013.

(51) Int. Cl.

| | |
|---|---|
| ***B29C 48/05*** | (2019.01) |
| ***H01B 3/44*** | (2006.01) |
| ***B05D 3/02*** | (2006.01) |
| ***H01B 12/00*** | (2006.01) |
| ***H01B 3/46*** | (2006.01) |

(52) U.S. Cl.

CPC .......... *H01B 3/448* (2013.01); *B05D 3/0254* (2013.01); *H01B 3/447* (2013.01); *H01B 3/46* (2013.01); *H01B 12/00* (2013.01)

(58) Field of Classification Search

CPC ........ H01B 12/02; H01B 12/08; H01B 12/10; H01L 39/143; H01L 39/248

See application file for complete search history.

(56) References Cited

U.S. PATENT DOCUMENTS

| | | | | |
|---|---|---|---|---|
| 5,212,013 A * | 5/1993 | Gupta | C03C 14/004 | 174/110 R |
| 6,863,752 B1 * | 3/2005 | Han | H01L 39/248 | 156/52 |
| 2014/0296077 A1 * | 10/2014 | Shen | H01B 12/08 | 505/231 |

FOREIGN PATENT DOCUMENTS

WO WO 9316495 A1 * 8/1993 ......... H01L 39/2419

OTHER PUBLICATIONS

Sullivan, James (WO 9316495).*

Maistralis, Sol-Gel Production of MgO, YBCO and BSCCO-2212 Fibres, Sol-Gel '97, 9th International Workshop on Glasses, Ceramics, Hybrids and Nanocomposites from Gels, Aug. 31, 1997, p. 266.*

Chen et al., Performance of titanium oxide-polymer insulation in superconducting coils made of Bi-2212/Ag-alloy round wire, IOP, Supercond. Sci. Technol. 26, 1-9 (Year: 2013).*

Mitchell, An Introduction to Materials Engineering and Science for Chemical and Materials Engineers, John Wiley & Sons, Inc., Hoboken, New Jersey, p. 721-724 (Year: 2004).*

Chen et al., Two-dimensional vortices in superconductors. Nature Phys 2007. vol. 3: 239-242.

(Continued)

*Primary Examiner* — Holly C Rickman
*Assistant Examiner* — Linda N Chau
(74) *Attorney, Agent, or Firm* — Eversheds Sutherland (US) LLP

(57) ABSTRACT

A coating mixture comprising at least one ceramic powder and a first and second binder that when applied to a substrate and heat treated produces a thin ceramic electrical insulation coating suitable for superconducting magnet applications.

9 Claims, 11 Drawing Sheets

(56) References Cited

OTHER PUBLICATIONS

Hasegawa et al., Improvement of Superconducting Properties of Bi-2212 Round Wire and Primary Test Results of Large Capacity Rutherford Cable. IEEE Trans. Appl. Supercond. 2001. vol. 11: 3034-7.
Weijers et al., The generation of 25.05 T using a 5.11 T Bi2Sr2CaCu2Ox superconducting insert magnet. Supercond. Sci. Technol. 2004. vol. 17: 636-44.
Markiewicz et al., Perspective on a Superconducting 30 T/1.3 GHz NMR Spectrometer Magnet. IEEE Trans. Appl. Supercond. 2006. vol. 16 (No. 2): 1523-1526.
Nachtrab et al., Development of High Superconductor Fraction Bi2Sr2CaCu2Ox/Ag Wire for MRI. IEEE Trans. Appl. Supercond. 2008. vol. 18 (No. 2): 1184-7.
Godeke et al. Development of Wind-and-React Bi-2212 Accelerator Magnet Technology. IEEE Trans. Appl. Supercond. 2008. vol. 18 (No. 2): 516-9.
Godeke et al., Wind-and-react Bi-2212 coil development for accelerator magnets. Supercond. Sci. Technol. 2010. vol. 23: 034022.
Schwartz et al. High Field Superconducting Solenoids via High Temperature Superconductors. IEEE Trans. Appl. Supercond. 2008. vol. 18 (No. 2): 70-81.
Larbalestier et al. Isotropic round-wire multifilament cuprate superconductor for generation of magnetic fields about 30 T. Nature Materials. 2014. vol. 13: 375-381.
Loschiavo. Processing issues of Bi2Sr2CaCu2O8 round wire involving leakage and alumino silicate insulation MS Thesis Florida State University. 2009: 1-76.
Dalban-Canassy et al., A Study of the local variation of the critical current in Ag-alloy clad, round wire Bi2Sr2CaCu2O8+x multi-layer solenoids. Supercond. Sci. Technol. 2012. vol. 25: 115015.
Malagoli et al., Evidence for length-dependent wire expansion, filament dedensification and consequent degradation of critical current density in Ag-alloy sheathed Bi-2212 wires. Supercond. Sci. Technol. 26 055018.
Hunt. Insulation for REBCO and Bi2212 conductors. Workshop on High Temperature Superconducting Magnets for Muon Collider. Fermi National Accelerator Lab. May 30-31, 2012: 1-10.
Kandel et al., Sol-gel-Derived Al2O3—SiO2 Composite Coating for Electrical Insulation in HTS Magnet Technology. IEEE Trans. Appl. Supercond. 2012. vol. 22 (No. 5): 7701605.
Jiang et al., Overpressure processing as the route to high critical current density in coil length Bi-2212 round wires. National High Magnetic Field Laboratory. MagLab Research Report. 2012. Boston, USA: 1.

* cited by examiner

CERAMIC ELECTRICAL INSULATION COATING

CROSS-REFERENCE TO RELATED APPLICATIONS

The present application claims priority to provisional U.S. Patent Application Ser. No. 61/845,737, filed on Jul. 12, 2013, titled "Ceramic Electrical Insulation Coating," which is hereby incorporated by reference in its entirety.

FEDERALLY SPONSORED RESEARCH OR DEVELOPMENT

This invention was made with Government support under Grant No. DMR-0654118 awarded by the National Science Foundation and the State of Florida. The government has certain rights in the invention.

BACKGROUND OF THE INVENTION

1. Field of the Invention

This invention relates, generally, to ceramic coatings. More specifically, it relates to thin ceramic coatings for electrical insulation.

2. Brief Description of the Prior Art

Bi-2212 ($Bi_2Sr_2CaCu_2O_{8-x}$) round wire is a very attractive conductor to build high field (>20 T) and high homogeneity superconducting magnets including the NMR and particle accelerator magnets [1-8]. Recently, a Bi-2212 superconducting magnet coil achieved 33.8 T combined field when tested in a 31.2 T resistive magnet [9], thus demonstrating a capability of the Bi-2212 round wire conductor to build >20 T superconducting magnets.

One of the key components of the superconducting magnet system is an electrical insulation on the magnet wire. However, development of an effective insulation on Bi-2212 round wire poses several challenges. First, the insulation has to be thin to obtain a high winding current density while having a high dielectric strength to provide sufficient electrical standoff in the magnet coil. Second, the insulation has to be compatible for "wind and react" process [6-8] of the magnet coil. Third, the insulation must not degrade the critical current $I_c$ of the Bi-2212 round wire.

Traditionally, Bi-2212 round wire is insulated by ceramic fiber wrap or alumino-silicate braid which in general has two drawbacks. First, the alumino-silicate braid insulation is about 150 μm thick causing a significant loss of conductor packing factor in the coil. Second, the alumino-silicate braid insulation reacts with the Ag-alloy sheath of the Bi-2212 round wire allowing silver to be absorbed into the braid fibers [10], [11]. This reaction erodes the Ag-alloy sheath of the Bi-2212 round wire, potentially causing Bi-2212 leakage during the partial melt heat treatment [11], [12]. The critical current ($I_c$) of alumino-silicate braided Bi-2212 wires were typically 15-20% lower than that of bare wires [10]. Recently, nGimat LLC has developed a ceramic coating on Bi-2212 round wire [13]. However, the reproducibility of the coating adherence after the heat treatment of the magnet coil has been the biggest challenge.

Accordingly, what is needed is an electrical insulation coating that is thinner than conventional ceramic fiber cloth sleeves. The thin insulating coating should also have a breakdown voltage of about 100 volts after heat treatment, possess adhesion and flexibility properties compatible with coil winding processes, withstand heat treatment process, be non-reactive with a Ag-alloy sheath of the wire, and exhibit oxygen permeability. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for thin ceramic coating for electrical insulation is now met by a new, useful, and nonobvious invention.

Various embodiments of the novel thin ceramic electrical insulation coating may comprise a coating formed from a base coat comprising at least one ceramic powder, a first binder comprising polyvinyl butyral, a second binder which reacts to form silicon dioxide during subsequent heat treatment of the coating, at least one organic solvent capable of dissolving the first binder, and at least one plasticizer. A ratio of the ceramic powder to the first binder may range from about 2.5:1 to about 3.5:1 by weight.

Additional embodiments may comprise a method for forming a thin ceramic electrical insulation coating on a substrate. The method may comprise forming a base coat mixture comprising at least one ceramic powder. The base coat mixture may also comprise a first binder comprising polyvinyl butyral, and a second binder comprising a polysilicate which reacts to form silicon dioxide during subsequent heat treatment of the coating. The base coat mixture may also comprise at least one organic solvent capable of dissolving the first binder, and at least one plasticizer. The base coat mixture may be applied to the substrate and dried. A top coat comprising a water-based polyacrylic binder may be applied over the base coat and then dried. The coated substrate may be exposed to a first heat treatment to decompose and at least partially remove the first and second binder and the polyacrylic binder. The coated substrate may also be exposed to a second heat treatment to decompose the polysilicate to silicon dioxide and sinter the ceramic powder.

Further embodiments may comprise a coated wire for superconducting applications, comprising a Bi-2212 wire, a base coat, and a top coat. The base coat may comprise at least one ceramic powder, a first binder comprising polyvinyl butyral, a second binder which reacts to form silicon dioxide during subsequent heat treatment of the coating, at least one organic solvent capable of dissolving the first binder, and at least one plasticizer. A ratio of the ceramic powder to the first binder may range from about 2.5:1 to about 3.5:1 by weight. The top coat may comprise a polyacrylic binder. The base coat may be adhered to the wire by exposing the coated wire to a first heat treatment to decompose and at least partially remove the first and second binder and the polyacrylic binder, and a second heat treatment to sinter the at least one ceramic powder.

These and other important objects, advantages, and features of the invention will become clear as this disclosure proceeds.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
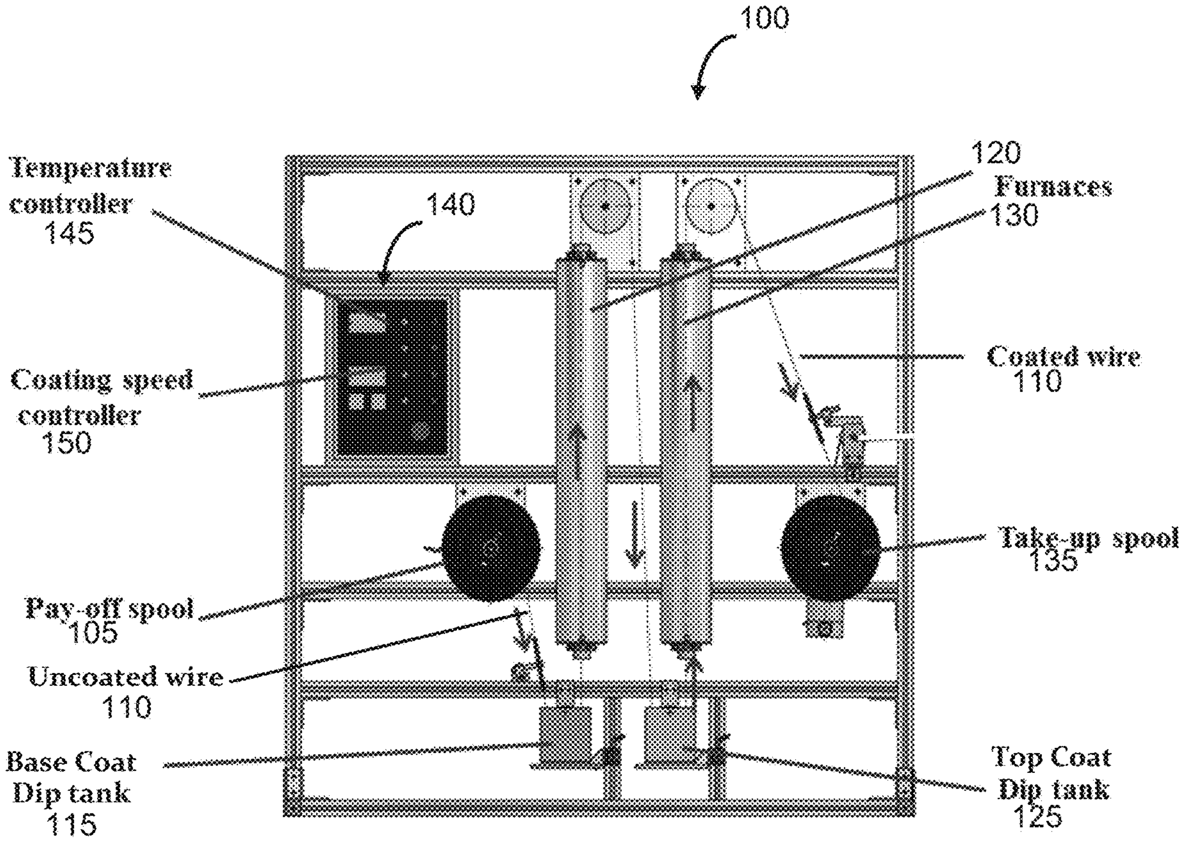
FIG. 1 is a schematic diagram of a coating apparatus for applying a base coat and a top coat to a wire substrate according to various embodiments.

In the following detailed description of the preferred embodiments, reference is made to specific embodiments by which the invention may be practiced. It is to be understood that other embodiments may be utilized without departing from the scope of the invention.

Various embodiments of a coating solution for forming a thin ceramic electrical insulation coating may comprise a base coat comprising at least one ceramic powder, a first binder comprising polyvinyl butyral, a second binder which reacts to form silicon dioxide during subsequent heat treatment of the coating, at least one organic solvent capable of dissolving the first binder, and at least one plasticizer. The coating solution may be applied to a substrate (by dip coating or any other coating method known in the art), such as a metallic wire or tape, then heat treated.

Formulation of a coating base coat mixture (slurry) is a first step in the coating process. The formulation of the base coat mixture includes of a proper choice of ceramic powders, binders, solvent systems and plasticizers. Binders hold the ceramic powder particles together and also provide a strong bonding between the coating and the wire in green (prior to heat treatment) state. Solvents not only dissolve the binder but also uniformly mix the binder with the ceramic powder particles and other components in the slurry. Plasticizers provide flexibility for bending the coated wire without cracking the coating. The slurry with proper formulation will result in strongly adhered coating on the wire both in the green state and after the heat treatment.

In various embodiments, the ceramic powder may be titanium dioxide ($TiO_2$). Titanium dioxide has a relatively low melting point (1742° C.) and is readily available due to its use as a commercial paint additive. Other ceramic powders that may be used in various embodiments include aluminum oxide ($Al_2O_3$), silicon dioxide ($SiO_2$), and the like, as well as mixtures of these and other ceramic powders. The ceramic powder may be a nanopowder comprised of particles having diameters generally between about 1-100 nanometers.

Polyvinyl butyral (PVB) may be selected as the first binder for the slurry formulation because it is widely used binder in the ceramic tape casting industry [16]. The PVB to $TiO_2$ powder ratio is one of the key parameters in the slurry composition since too small an amount of PVB may reduce the coating strength in green state whereas too large an amount of PVB may result in poor ceramic sintering. Various embodiments may comprise a ceramic powder to PVB ratio ranging from about 2.5:1 to about 3.5:1 by weight. Certain embodiments may comprise a ceramic powder to PVB ratio of 3:1 by weight. The base coat may also comprise a second binder. The second binder may comprise a polysilicate which decomposes to form $SiO_2$ at Bi-2212 heat treatment temperature and acts as a sintering aid to $TiO_2$.

In addition to PVB, the first binder may comprise a binder that is soluble in organic solvents, such as polypropylene carbonate (PPC) and polyethylene carbonate (PEC). Factors that may affect the selection of the first binder may include solubility in a top coat solution, adherence to the substrate, and cost and availability.

In various embodiments, the second binder may comprise a polysilicate. During subsequent heat treatment (described further below), the polysilicate may decompose to form $SiO_2$. The $SiO_2$ may act as a sintering aid for the cermic powder during the heat treatment. In various embodiments, the second binder may comprise a sol-gel to aid in homogenous mixing within the base coat.

The base coat mixture may be prepared by ball milling of $TiO_2$ powder, PVB, polysilicate sol-gel, and plasticizers in ethanol and xylene (Table 1). The ball milling is performed using ~6 mm diameter cylindrical $ZrO_2$ media for 48 hours in a high density polyethylene milling jar. The resulting slurry may have a viscosity of about 225 cPs at 21° C. (measured by Brookfield viscometer) and a surface tension of about 0.02614 N/m (measured by Wilhelmy plate method at EBATCO Inc.). In various embodiments, the viscosity may range from about 200 to about 250 cPs at 21° C., and the surface tension may range from about 0.02 to about 0.03 N/m.

TABLE 1

Example Formulation of the Base Coat Mixture

| Ingredients | Function | Weight % |
|---|---|---|
| $TiO_2$ powder (40 nm) | Ceramic | 15 |
| Polyvinyl butyral | Binder | 5 |
| Polysilicate sol-gel | Binder | 1 |
| Xylene:ethanol = 1:1 | Solvents | 78 |
| Butyl benzoyl phthalate | Plastisizer | 0.5 |
| Polyalkylene glycol | Plastisizer | 0.5 |

Dip coating of the Bi-2212 wire with base coat mixture may yield reasonably stronger green coating adhesion on the wire. However, due to the relatively rough surface of the coating, the abrasion resistance of the coating may not be sufficient for the coil winding process. Therefore, an additional top coat of water based binder (polyacrylic) which may produce a smoother surface may be applied to enhance the abrasion resistance of the coating.

In addition to polyacrylics, the top coat binder may comprise a water soluble binder such as polyvinyl acetate (PVA) and polyvinyl acetate polymer (PVAc). Factors that may affect the selection of the top coat binder include non-dissolution of the base coat, and decomposing at a temperature lower or about the same as the first and second binders.

In various embodiments, the wire substrate may be coated using a dip coating apparatus such as that illustrated in FIG. 1. The coating apparatus 100 may comprise a pay-off spool 105 that contains uncoated wire 110. The pay-off spool 105 may rotate, allowing the uncoated wire 110 to extend from the pay-off-spool 105 to the base coat dip tank 115. The base coat dip tank 115 may contain the base coat mixture as described previously. The wire 110 leaves the base coat dip tank 115 coated with the wet base coat mixture. The coated wire then travels through a first vertical tube furnace 120 to dry the base coat. After exiting the first vertical tube furnace 120, the base coated wire 110 passes through a top coat dip tank 125 containing the polyacrylic top coat solution. The top coated wire 110 then passes through a second vertical tube furnace 130 to dry the top coat. The coated wire 110 may then be collected on a take-up spool 135. The take-up spool 135 may be driven by a motor to draw the wire 110 through the coating apparatus 100. In addition, the coating apparatus 100 may comprise a control system 140 that includes a temperature controller 140 for the vertical tube furnaces 120, 130 and a speed controller 150 for the take-up spool motor. In various embodiments, the speed that the wire 110 moves through the coating apparatus 100 may be about 0.6 m/min, with each furnace 120, 130 set at a temperature of about 150° C.

Figure 2:
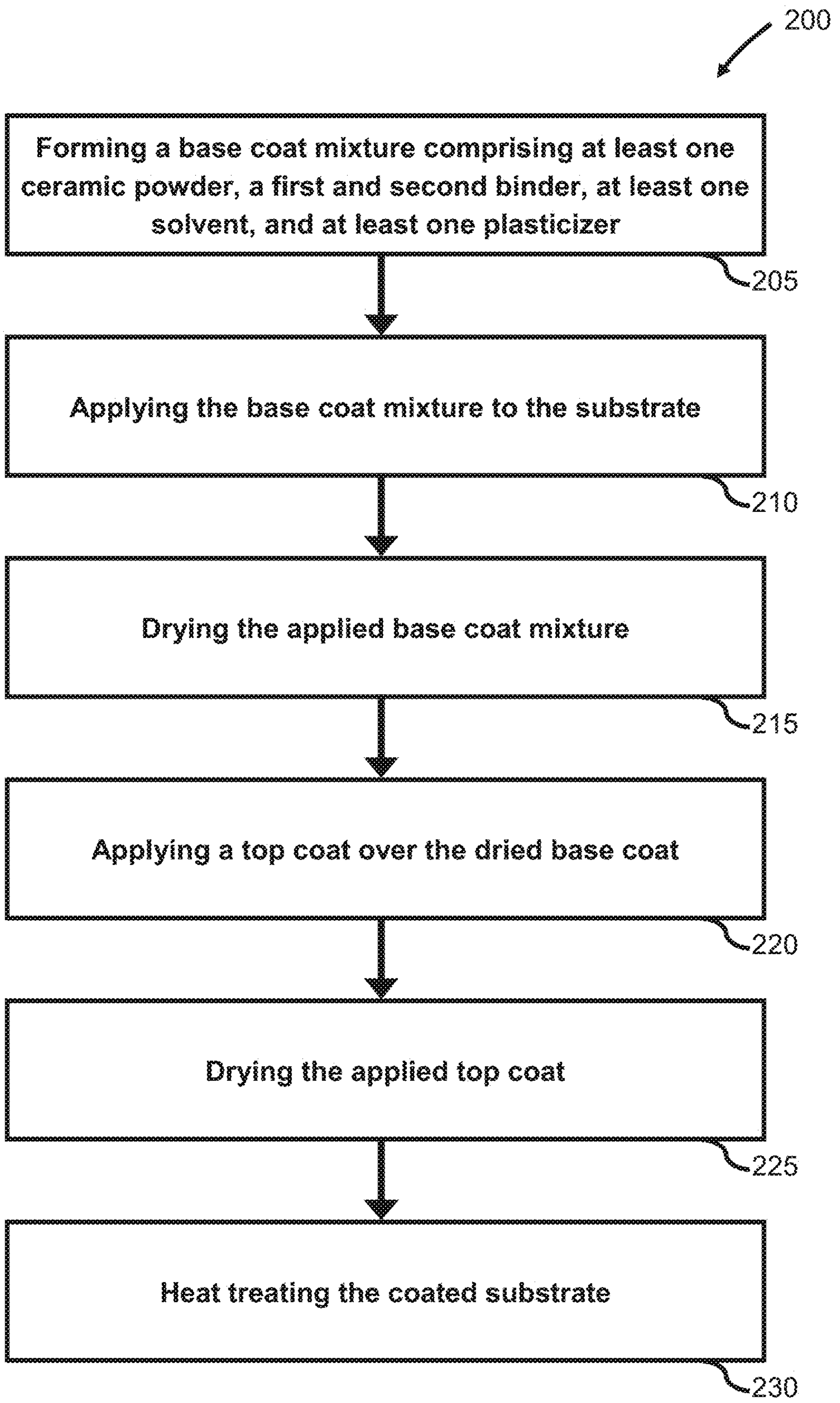
FIG. 2 is a flow diagram of an exemplary method for forming a thin ceramic electrical coating on a substrate according to various embodiments.

FIG. 2 illustrates a flow diagram of an exemplary method for forming a thin ceramic electrical insulation coating on a substrate. The method 200 comprises first forming a base coat mixture at step 205. The base coat mixture may comprise at least one ceramic powder, such as $TiO_2$ or $Al_2O_3$. The at least one ceramic powder may also comprise a mixture of ceramic powders in various embodiments. The base coat mixture may also comprise a first and second binder. The first binder may comprise polyvinyl butyral. The second binder may comprise a compound capable of forming silicon dioxide during subsequent heat treatment of the coating, such as a polysilicate. Further, the base coat mixture may comprise at least one organic solvent capable of dissolving the first binder and at least one plasticizer. A ratio of the ceramic powder to the first binder may range from about 2.5:1 to about 3.5:1 by weight.

At step 210, the base coating mixture may be applied to the substrate, and then the applied base coat may be dried at step 215. A top coat containing a polyacrylic binder may be applied over the base coat at step 220, and then dried at step 225. The coated substrate may be heat treated at step 230. The heat treatment may comprise a first heat treatment and a second heat treatment. The first heat treatment may comprise ramping up the temperature of the coated substrate to a temperature to at least partially decompose and remove the first binders and the polyacrylic binder, then ramping down the temperature. The second heat treatment may comprise ramping up the temperature of the coated substrate to a temperature to at least partially decompose the polysilicate second binder to silicon dioxide and to sinter the ceramic powder, then ramping down the temperature.

Example 1

Thermal Analysis (TGA/DTA) of Coating

Figure 3:
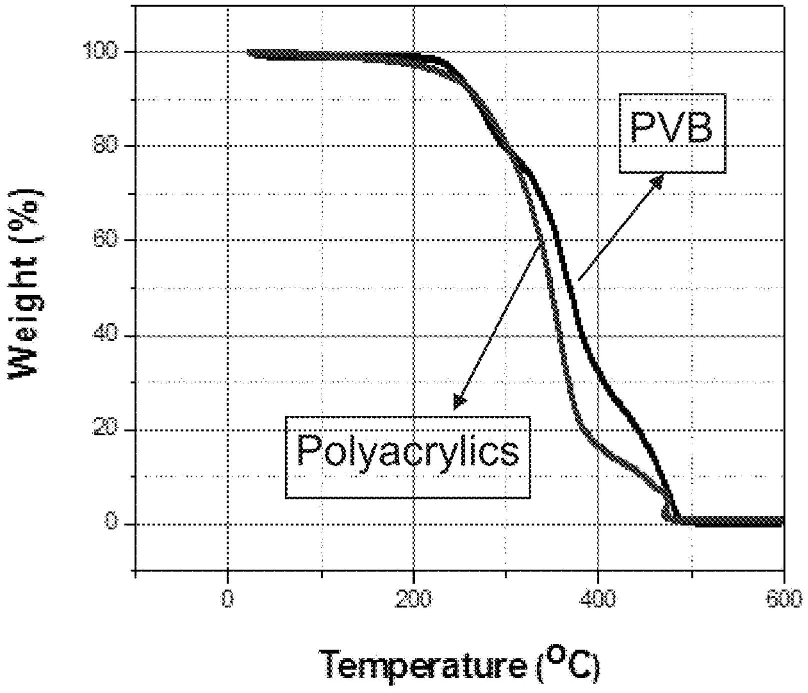
FIG. 3 is a TGA thermal analysis plot of bulk samples of PVB and polyacrylics according to various embodiments.
Figure 4:
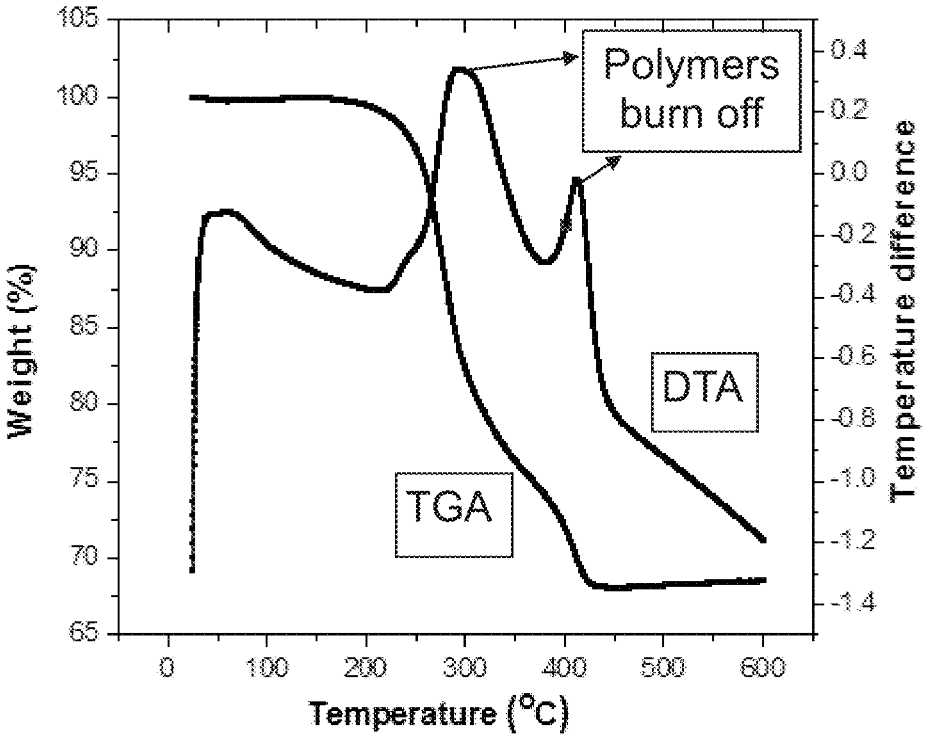
FIG. 4 is a TGA/DTA thermal analysis plot of a coated substrate according to various embodiments.

The burnout behavior of the various binders in the coating was examined with TGA/DTA. Two analyses were carried out. The first involved bulk samples of PVB and polyacrylics. The second analysis involved a wire substrate was coated with a base coat formulated according to Table 1, and then a polyacrylic top coat was applied. Both tests were run in pure oxygen in one atmospheric pressure at heating rate of 5° C./minute from room temperature to 800° C. As shown by the TGA plot in FIG. 3 (bulk samples) and the TGA-DTA plots in FIG. 4 (coated wire samples), significant weight loss occurred at temperatures between 170° C. and 430° C. and an exothermic reaction of the binders occurred near 300° C. and 400° C. (FIG. 4, DTA analysis).

Example 2

Winding and Heat Treatment of a Small Bi-2212 Test Coil

The coating should have the desired properties before and after Bi-2212 heat treatment of the magnet coils. Therefore, the $TiO_2$ coated wire was wound into a small test coil on a 15 mm diameter Inconel 600 alloy mandrel. The mandrel was oxidized and spray-coated with $ZrO_2$ prior to the winding to minimize the reaction between the $TiO_2$ coating and the mandrel.

Figure 5A:
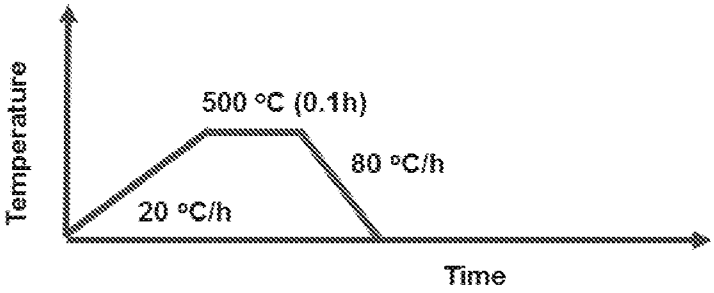
FIG. 5A is a plot of the heat treatment profile to decompose the PVB and polyacrylic binders in the coating.
Figure 5B:
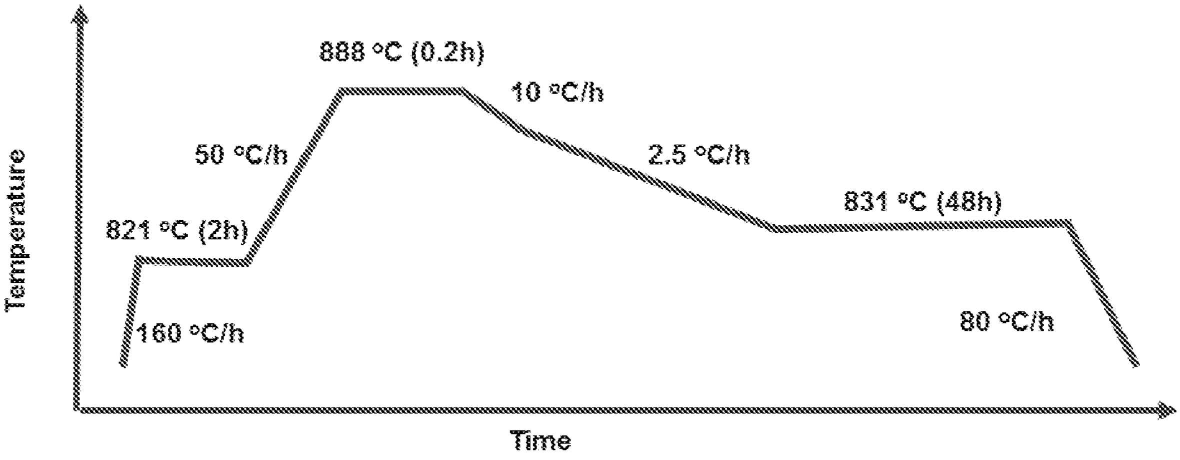
FIG. 5B is a plot of the heat treatment profile for Bi-2212 wire according to various embodiments.

The test coil was subjected to the heat treatment in two steps using the heat treatment profile as shown in FIGS. 5A and 5B. The first step (FIG. 5A) was a slow ramp rate of 20° C./h up to 500° C. and a soak for 0.1 hours for the gradual decomposition and removal of the binders (PVB and the polyacrylic) from the coating. In the second step, the coil was heat treated at 100 atm pressure in an overpressure (OP) system (1% oxygen, 99% inert gas, such as argon) by ramping up to 888° C. and then back to room temperature as shown in FIG. 5B. The OP heat treatment remarkably enhances the critical current density in the Bi-2212 conductor [9], [17]. The goal of OP heat treatment of insulated wire is to check the compatibility of the coating with the OP processing of Bi-2212 conductor. A control sample of uncoated Bi-2212 wire was also heat treated together with the test coil.

Example 3

Thickness

Thickness of the coating was measured by a Mitutoyo digital micrometer with flat anvils and results were confirmed by scanning electron microscope (SEM) cross sectional images. In a 0.8 mm diameter Bi-2212 wire, the thickness of the base coat was about 10 μm when coated with slurry of 200 cPs viscosity and a wire withdrawal speed of 0.6 m/min. The thickness of the top coat was only about 1 μm making total green thickness about 11 μm. The thickness of the coating after the Bi-2212 heat treatment was about 7 μm. In principle, the coating thickness varies with viscosity of the slurry, the withdrawal speed and the wire diameter. For a given wire diameter, the viscosity and the withdrawal speed can be adjusted to achieve a desired coating thickness. The viscosity of the slurry can be adjusted simply by varying the amount of the solvents in the composition.

In order to accurately control the coating thickness, the thickness variation with respect to the radius of the wire, viscosity of the slurry and the withdrawal speed of the wire were studied. Copper wires having different radii were coated with different slurry viscosities and withdrawal speeds. The variation of coating thicknesses with respect to the wire radii, the withdrawal speeds and the slurry viscosities are given in the FIGS. 6, 7 and 8 respectively.

According to White and Tallmadge [18], the thickness of the wet film h entrained by a moving wire from a reservoir of viscous liquid is given by Equation 1, $$h = \frac{KrCa^{\frac{2}{3}}}{1 - KCa^{\frac{2}{3}}} \quad \text{Eqn. 1}$$

where Ca=ηU/γ is capillary number, U is the withdrawal speed, η is the viscosity, γ is the surface tension of the liquid, and r is the radius of the wire, and K=1.33 is a constant. This theory holds true for Ca<<1 and ignores the effect of gravity in the coating process.

Figure 6:
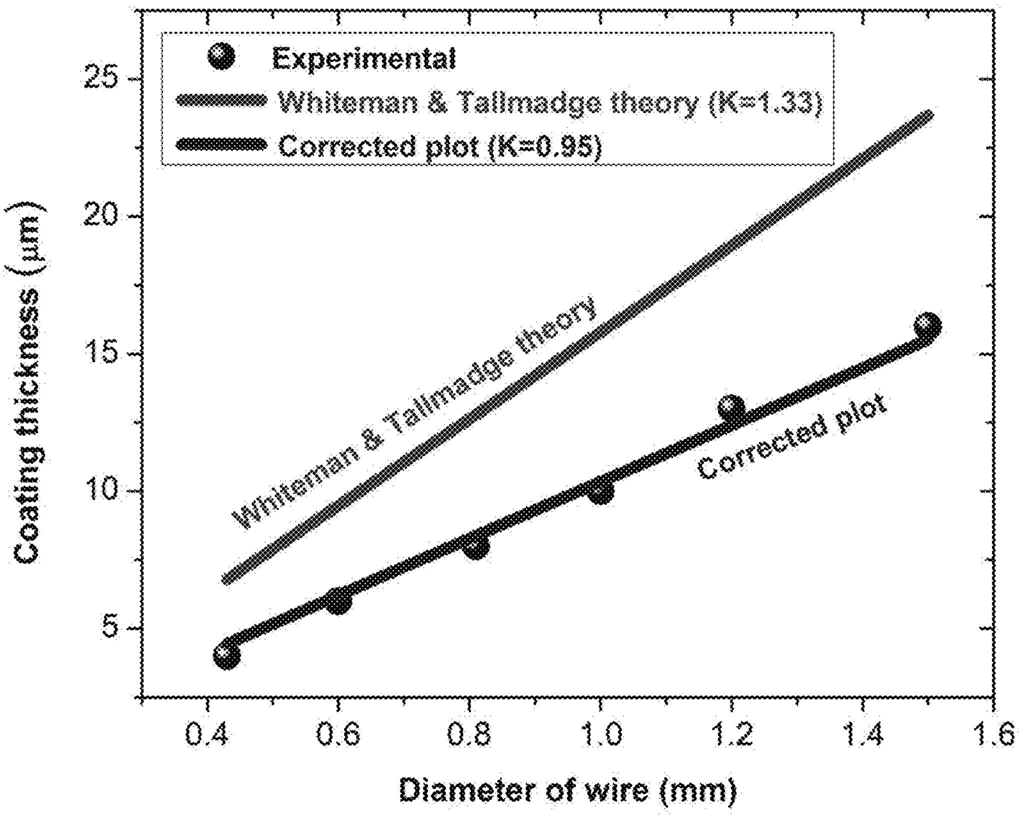
FIG. 6 is a plot of theoretical and experimental values of $TiO_2$ coating (green) thickness on Cu wires of various radii according to various embodiments.
Figure 7:
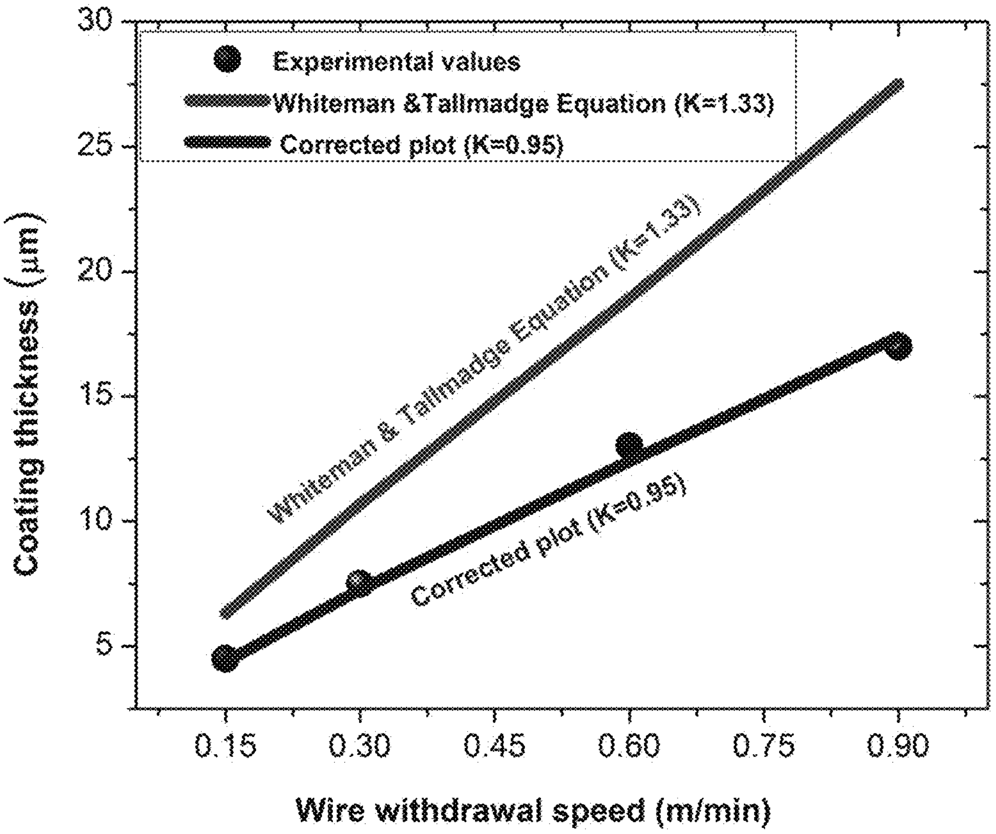
FIG. 7 is a plot of $TiO_2$ coating (green) thickness with respect to the wire withdrawal speed according to various embodiments.
Figure 8:
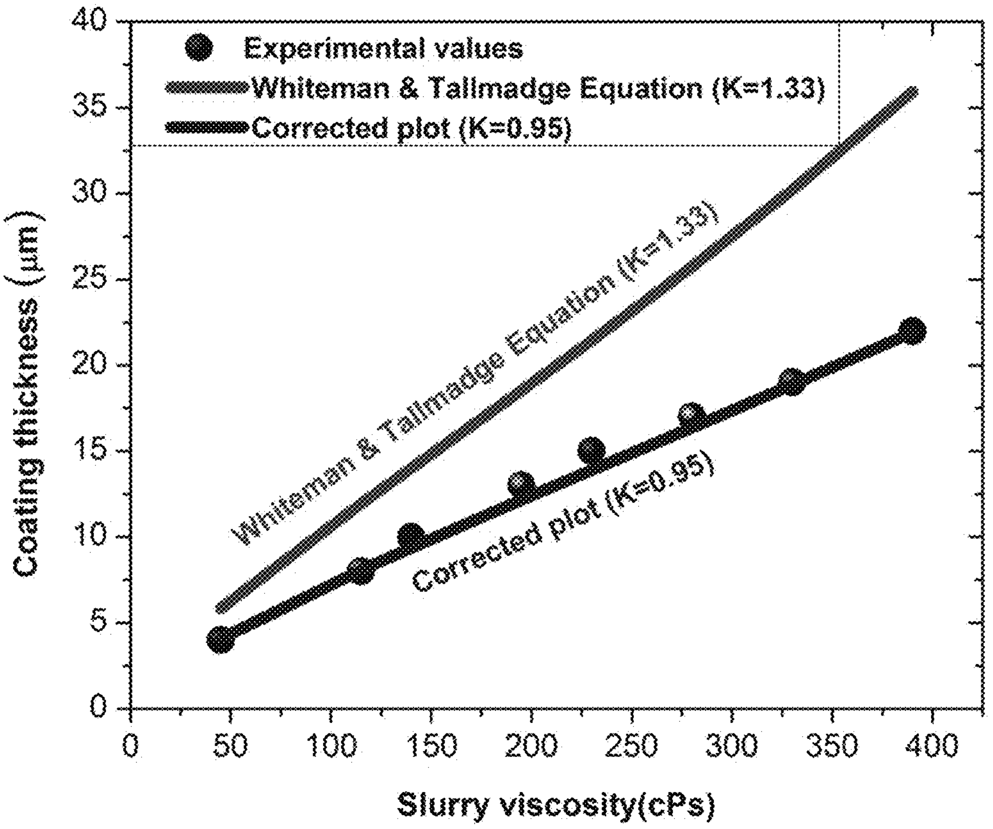
FIG. 8 is a plot of $TiO_2$ coating (green) thickness with respect to the slurry viscosity according to various embodiments.

The theoretical thickness of wet coating on various radii wire was calculated using Equation 1 where γ=0.264 mN/m and U=0.01 m/s. The calculated wet coating thickness was converted to dried coating thickness based on the fact that the dried coating is about 10% by volume of the wet coating due to solvent evaporation. FIG. 6 shows the plot of thickness values against the radii of the wire where experimental values were not in good agreement with the thickness values derived from Equation 1. The difference between Equation 1 and the experimental values was probably due to the role of gravity, which was ignored in the derivation of Equation 1. However, a good fit was obtained between the experimental values and the theoretical values with K=0.95. This also fits well in the plots of coating thickness against the withdrawal speed (FIG. 7) and the viscosity of the slurry (FIG. 8).

Example 4

Breakdown Voltage/Dielectric Strength of the Coating

Two cylindrical electrodes were made in contact orthogonally to the insulated wire sample surface with a 0.1 kg force for breakdown voltage measurements. The measured breakdown voltage was not sensitive to the applied force within this range. The measurement was carried out at room temperature using a Fluke 1550B Megohm meter. The average breakdown voltage on a Bi-2212 wire with the heat treated coating of 7 μm thickness was about 150 V, corresponding to a dc dielectric strength of about 21 MV/m.

Example 5

Scratch Resistance Test

A scratch resistance test was conducted by a Taber scratch tester modified for this purpose. The coated wire sample was mounted on the sample holder stage which has a manual linear drive mechanism. Linear scratch test was performed by sliding the coated wire against a scratch tip, an orthogonal 0.60 mm diameter piano wire, with increasing contact forces until the coating fails electrically (short circuit). The test showed that the coatings did not fail until the applied force reached 5 N. In addition, the sample wire was scratch-tested repeatedly under a constant force until the coating failure occurred. With 1 N applied load, the coating failure occurred only after 100 scratches. This test showed that the scratch resistance of the coating is sufficient for magnet coil winding.

Example 6

Microstructure

Figure 9:
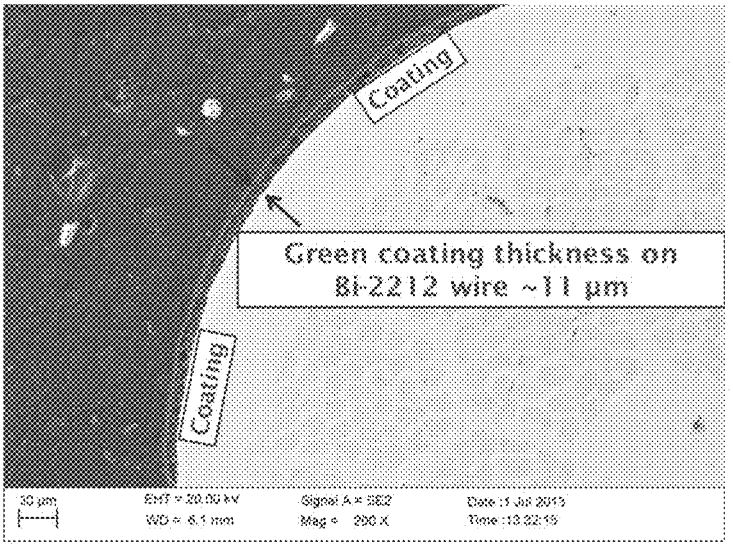
FIG. 9 is a cross-sectional scanning electron microscope image of a $TiO_2$ coated Bi-2212 wire before heat treatment (green sample) according to various embodiments.
Figure 10:
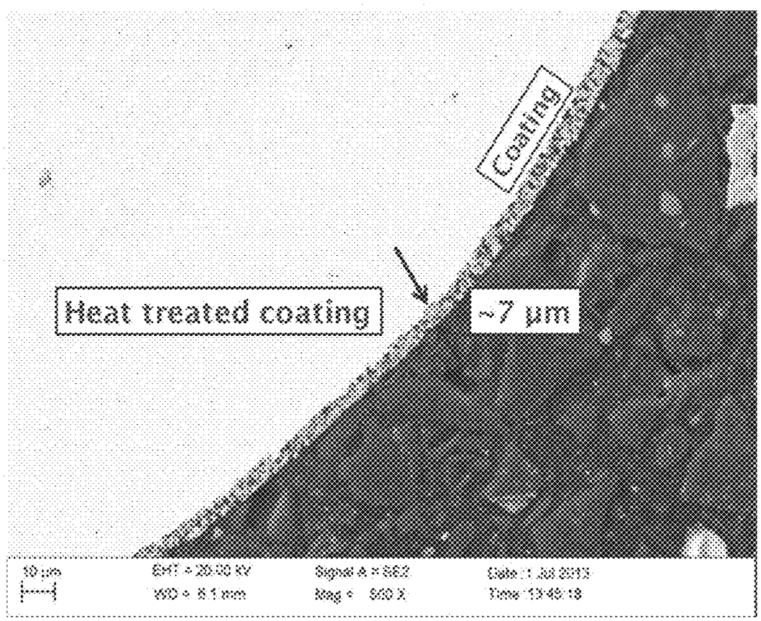
FIG. 10 is a cross-sectional scanning electron microscope image of a $TiO_2$ coated Bi-2212 wire after heat treatment according to various embodiments.
Figure 11:
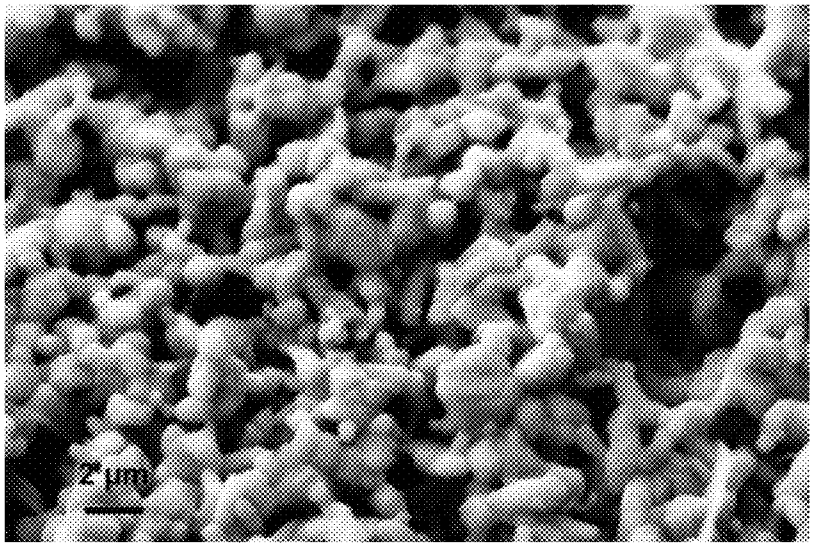
FIG. 11 is a scanning electron microscope image of a surface of a sintered $TiO_2$ coating showing the porosity that provides a pathway for oxygen permeability during the heat treatment of Bi-2212 wire according to various embodiments.

The surface morphology of the coating was examined with a Zeiss 1450 scanning electron microscope (SEM) before and after the heat treatment. FIGS. 9 and 10 show the cross-sectional SEM images of the coating on Bi-2212 wire before and after heat treatment, respectively. The SEM images indicated that coating was adequately adhered onto the surface of the Bi-2212 wire before and after the heat treatment. FIG. 11 shows the surface of the coating on the heat treated wire which is porous with interconnected (sintered) $TiO_2$ particles.

Example 7

Effect of Insulation on Critical Current ($I_c$)

Transport critical current ($I_c$) measurements were performed on several heat treated Bi-2212 wires with and without insulation. The measurements were carried out at 4.2 K temperature and 5 T magnetic field. The $I_c$ values were determined using 1 $\mu Vcm^{-1}$ electric field criterion.

The $I_c$ value of the bare wire sample was 354 A and that of heat treated different samples were 379+/−5 A showing that there was no degradation in $I_c$ values due to the coating on the wire. In a previous study with $SiO_2$ glass sleeve insulation on Bi-2212 cables, it was reported that $SiO_2$ formed a glass phase and reacted with Ag-alloy sheath of the Bi-2212 wire and degraded the $I_c$ values of the Bi-2212 conductor [6], [7]. The results here clearly indicated that the disclosed insulation coating does not degrade the $I_c$ value of the Bi-2212 conductor despite the fact that it may contain a small amount of $SiO_2$ from the polysilicate binder.

Glossary of Claim Terms

Base coat: The first layer of coating applied to a substrate and in direct contact with the surface of the substrate.

Bi-2212: A specific type of bismuth strontium calcium oxide high-temperature superconductors having the formula $Bi_2Sr_2CaCu_2O_{8-x}$. The designation "2212" refers to the sequence of numbers of the metallic ions.

Binder: A material that helps hold particles of the ceramic powder together and promotes adhesion of the base coat to the substrate.

Electrical insulation coating: A coating that, when applied to a coil of wire in use in a superconducting device, prevents electrical short circuits within the coil.

Plasticizer: A material added to a coating to provide flexibility to the dried coating to prevent cracking when the wire is bent.

Polyacrylic: A polymer of acrylic acid having the general formula $(C_3H_4O_2)_n$.

Polysilicate: A polymeric silicate compound formed by the reaction of silica ($SiO_2$) and basic metal oxides.

Sol-gel: Generally, a colloidal suspension of very small particles in a continuous liquid medium which undergoes hydrolysis and condensation polymerization to form a gel.

Surface tension: A measure of the force required to break a film of a liquid of length 1 m.

Top coat: A layer of coating applied to a substrate after one or more layers of a base coat have been applied to the substrate. The top coat has little if any direct contact with the substrate.

Viscosity: A measure of a fluid's resistance to gradual deformation by shear or tensile stress.

REFERENCES

[1] Chen B, Halperin W P, Guptasarma P, Hinks D G, Mitrovic V F, Reyes A P and Kuhns P L 2007 *Nature Phys.* 3 239

[2] Hasegawa T et al 2001 *IEEE Trans. Appl. Supercond.* 11 3034-7

[3] Weijers H W, Trociewitz U P, Marken K, Meinesz M, Miao H and Schwartz J 2004 *Supercond. Sci. Technol.* 17 636-44

[4] Markiewicz W D, Miller J R, Schwartz J, Trociewitz U P and Weijers H W 2006 *IEEE Trans. Appl. Supercond.* 16 1523

[5] Nachtrab W T, Renaud C V Jr, Wong T, Liu X T, Shen T M, Trociewitz U P and Schwartz J 2008 *IEEE Trans. Appl. Supercond.* 18 1184-7

[6] Godeke A et al. 2008 *IEEE Trans. Appl. Supercond.* 18 516-9

[7] Godeke A et al. 2010 *Supercond. Sci. Technol.* 23 034022

[8] Schwartz J et al. 2008 *IEEE Trans. Appl. Supercond.* 18 70-81

[9] Larbalestier D C et al. 2014 *nature materials* 13 375-381

[10] LoSchiavo M P 2010 Processing issues of $Bi_2Sr_2CaCu_2O_8$ round wire involving leakage and alumino silicate insulation *MS Thesis Florida State University*

[11] Dalban-Canassy M, Myers D A, Trociewitz U P, Jiang J, Hellstrom E E, Viouchkov Y and Larbalestier D C 2012 *Supercond. Sci. Technol.* 25 115015

[12] Malagoli A, Lee P J, Ghosh A K, Scheuerlein C, Di Michiel M, Jiang J, Trociewitz U P, Hellstrom E E and Larbalestier D C 2013 *Supercond. Sci. Technol.* 26 055018

[13] Hunt A, "Insulation for REBCO and Bi2212 conductors" Workshop on High Temperature Superconducting Magnets for Muon Collider Fermi National Accelerator Lab, USA, May 30-31, 2012

[14] Kandel H, Lu J, Jiang J, Han K, Gundlach S, Viouchkov Y, Markiewicz W D and Weijers, *IEEE Trans. Appl. Supercond.* 5 7701605

[15] Satas D, Tracton A 2001 $2^{nd}$. edn. Coatings Technology Handbook (Marchel Dekker, Inc., New York, N.Y.) pp. 49

[16] Mistier. R, Twiname E 200 Tape Casting Theory and Practice, (American ceramic society, Ohio, USA) pp. 43.

[17] Jiang et al., 2013 Overpressure processing as the route to high critical current density in coil length Bi-2212 round wires, 10rBA-01, MT23, Boston, USA

[18] D. White and J. Tallmadge, *AlChE J,* 12, 1966 (333)

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A green coated wire for superconducting applications, the green coated wire comprising:

a Bi-2212 wire comprising an Ag-alloy sheath;

a base coat surrounding the Ag-alloy sheath of the Bi-2212 wire, the base coat comprising:

15% by weight $TiO_2$ powder,

5% by weight polyvinyl butyral,

1% by weight polysilicate sol-gel,

78% by weight xylene ethanol=1:1, 0.5% by weight butyl benzoyl phthalate, and 0.5% by weight polyalkylene glycol; and a top coat surrounding the base coat, the base coat surrounding the Ag-alloy sheath of the Bi-2212 wire, wherein the top coat comprises a polyacrylic binder, wherein the top coat does not dissolve in the base coat and a decomposing temperature of the top coat is substantially equal to, or lower than, a decomposing temperature of the first binder and the second binder.

2. The green coated wire of claim 1, wherein the base coat surrounding the Bi-2212 wire is about 10 μm thick and the top coat is about 1 μm thick.

3. The green coated wire of claim 1, wherein a viscosity of the base coat ranges from about 200 to about 250 cPs at 21° C.

4. The green coated wire of claim 1, wherein a surface tension of the base coat ranges from about 20 to about 30 mN/m.

5. A green coated wire for superconducting applications, the green coated wire comprising:

a Bi-2212 wire comprising an Ag-alloy sheath;

a base coat surrounding the Ag-alloy sheath of the Bi-2212 wire, the base coat comprising:

at least one ceramic powder;

a first binder comprising polyvinyl butyral, wherein a ratio of the ceramic powder to the first binder is between about 2.5:1 and 3.5:1 by weight;

a second binder comprising a polysilicate;

two plasticizers;

wherein the second binder comprising a polysilicate is non-reactive with the Ag-alloy sheath of the Bi-2212 wire; and a top coat surrounding the base coat, the base coat surrounding the Ag-alloy sheath of the Bi-2212 wire, wherein the top coat comprises a polyacrylic binder, wherein the top coat does not dissolve in the base coat and a decomposing temperature of the top coat is substantially equal to, or lower than, a decomposing temperature of the first binder and the second binder, wherein the base coat surrounding the Ag-alloy sheath of the Bi-2212 wire is about 10 μm thick and the top coat is about 1 μm thick, and wherein the base coat surrounding the Bi-2212 wire comprises:

15% by weight $TiO_2$ powder;

5% by weight polyvinyl butyral;

1% by weight polysilicate sol-gel;

78% by weight xylene ethanol=1:1;

0.5% by weight butyl benzoyl phthalate; and 0.5% by weight polyalkylene glycol.

6. The green coated wire of claim 5, wherein a viscosity of the base coat ranges from about 200 to about 250 cPs at 21° C.

7. The green coated wire of claim 5, wherein a surface tension of the base coat ranges from about 20 to about 30 mN/m.

8. A heat treated coated wire for superconducting applications, the heat treated coated wire comprising:

a Bi-2212 wire comprising an Ag-alloy sheath, wherein a diameter of the Bi-2212 wire is 0.8 mm and wherein the Ag-alloy sheath is in contact with the Bi-2212 wire;

a porous coating surrounding the Ag-alloy sheath of the Bi-2212 wire, wherein the porous coating is positioned on top of the Ag-alloy sheath of the Bi-2212 wire, wherein the porous coating exhibits a porosity that provides a pathway for oxygen permeability, wherein the porous coating has a thickness of about 7 μm, and wherein the porous coating comprises;

at least one sintered ceramic powder comprising a plurality of interconnected ceramic powder particles;

a partially decomposed polysilicate, wherein the partially decomposed polysilicate is non-reactive with the Ag-alloy sheath of the Bi-2212 wire; and silicon dioxide decomposed from the polysilicate, wherein the porous coating is formed from a base coating composition comprising:

15% by weight $TiO_2$ powder;

5% by weight polyvinyl butyral;

1% by weight polysilicate sol-gel;

78% by weight xylene ethanol=1:1;

0.5% by weight butyl benzoyl phthalate; and 0.5% by weight polyalkylene glycol.

9. The heat treated coated wire of claim 8, wherein the porous coating does not degrade the transport critical current of the Bi-2212 wire.

* * * * *